(12) United States Patent
Odle et al.

(10) Patent No.: US 8,101,125 B2
(45) Date of Patent: Jan. 24, 2012

(54) REDUCING CORROSION IN A TURBOMACHINE

(75) Inventors: Robert R. Odle, Elkton, MD (US); David C. Seib, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 337 days.

(21) Appl. No.: 12/473,053

(22) Filed: May 27, 2009

(65) Prior Publication Data
US 2010/0303670 A1 Dec. 2, 2010

(51) Int. Cl.
*C23F 11/00* (2006.01)
(52) U.S. Cl. ............ 422/7; 422/9; 422/10; 422/12
(58) Field of Classification Search ............ 422/7, 9, 422/10, 12
See application file for complete search history.

(56) References Cited

U.S. PATENT DOCUMENTS 3,565,573 A * 2/1971 Thirkell .................. 423/226
5,816,048 A * 10/1998 Bronicki et al. .......... 60/641.5

\* cited by examiner

*Primary Examiner* — Sean E Conley
(74) *Attorney, Agent, or Firm* — Edmonds & Nolte, PC

(57) ABSTRACT

A method and system for reducing corrosion in a turbomachine. The method may include providing a process gas to a condenser, wherein the process gas contains a condensate having a pH level that is acidic. The condenser may be configured to remove at least a portion of the condensate from the process gas. Any condensate that is not removed is a remaining condensate. The method may further include increasing the pH level of the remaining condensate to above about 4 by mixing the process gas and the remaining condensate with an amount of pH modifier to form a mixture, and directing the mixture to a compressor coupled to the condenser, wherein the compressor is configured to compress the mixture.

9 Claims, 3 Drawing Sheets

REDUCING CORROSION IN A TURBOMACHINE

BACKGROUND

When high concentrations of an acidic component, such as $CO_2$, $H_2S$, HF, HCl, $H_2SO_4$, or $H_3NO_3$ are present in a gas, the gas is generally referred to as an "acid gas." The acidic component of acid gas will generally cause the pH of liquids contained in the gas, such as water, to fall to between about 3 pH and about 5 pH, for example. In gas compression technology, liquids (e.g., water) that are present in the water have been shown to cause various types of corrosion to the metal and alloy components of gas compression equipment. Such corrosion may include general corrosion, Sulfide Stress Cracking (SSC), and undeposit corrosion.

If gases containing an acidic component are compressed with aqueous water (moisture) present in the system, the resulting moisture, containing the acidic gases, may be corrosive to the internal metal components in the compressor. Condensation that forms when cooling an acidic gas may also be corrosive to the internal metal components. The corrosion is typically more severe during the initial stages of compression, because liquid water is most likely to be present during the initial stages. Corrosion can also be problematic in later stages of compression for very wet gases, or when condensate is formed from process upsets, shut downs and startups that allow cooling of gas below its dew point in a given stage of compression.

One method of preventing corrosion of metal components in gas compression equipment may be to construct such metal components using an alloy that is more resistant to corrosion. However, such alloys may be expensive. Thus, there is a need for a less expensive method for reducing corrosion in gas compression equipment.

SUMMARY

Embodiments of the disclosure may provide a method for reducing corrosion in a turbomachine. The method may include providing a process gas to a condenser, wherein the process gas contains a condensate having a pH level that is acidic. The condenser may be configured to remove at least a portion of the condensate from the process gas. Any condensate that is not removed is a remaining condensate. The method may further include increasing the pH level of the remaining condensate to above about 4 by mixing the process gas and the remaining condensate with an amount of pH modifier to form a mixture, and directing the mixture to a compressor coupled to the condenser, wherein the compressor is configured to compress the mixture.

Embodiments of the disclosure may further provide a system for reducing corrosion in a turbomachine. The system may include a process gas source coupled to a condenser, wherein the process gas source is configured to provide to the condenser a process gas that includes a condensate having a pH level that is acidic. The condenser may be configured to remove at least a portion of the condensate from the process gas. Any condensate that is not removed is a remaining condensate. A pH modifier source may be coupled to a mixing mechanism coupled to the condenser, wherein the pH modifier source is configured to provide an amount of pH modifier to the mixing mechanism. The condenser may be configured to provide the process gas and the remaining condensate to the mixing mechanism, and the mixing mechanism may be configured to mix the process gas and the remaining condensate with the pH modifier to form a mixture. The amount of pH modifier may increase the pH level of the remaining condensate to above about 4. The system may also include a compressor coupled to the mixing mechanism, wherein the compressor may be configured to receive the mixture from the mixer, and may compress the mixture.

Embodiments of the disclosure may further provide a system for reducing corrosion in a turbomachine, which may include a means for providing a process gas to a means for condensing. The process gas may contain a condensate having a pH level that is acidic, and the means for condensing may be configured to remove at least a portion of the condensate from the process gas. Any condensate that is not removed is a remaining condensate. The system may also include a means for calculating an amount of pH modifier to be mixed with the process gas and the remaining condensate to increase the pH level of the remaining condensate to above about 4. Further, the system may include a means for providing the amount of pH modifier to a means for mixing, wherein the means for mixing is coupled to the means for condensing, and the means for mixing is configured to mix the amount of pH modifier, the remaining condensate, and the process gas to form the mixture. The system may also include a means for compressing coupled to the means for mixing, wherein the means for compressing is configured to compress the mixture.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
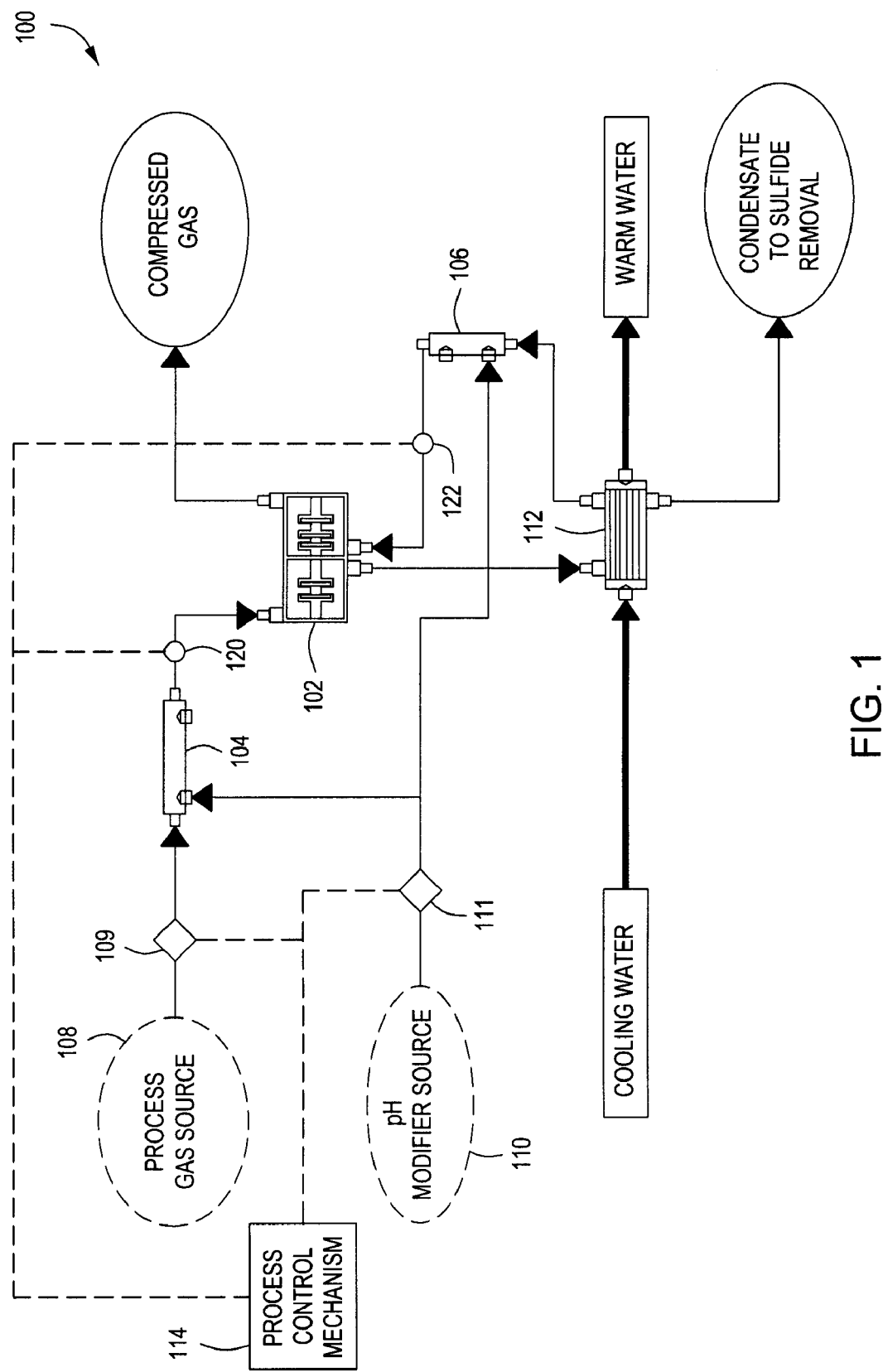
FIG. 1 illustrates a schematic view of a turbomachine system according to one or more aspects of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from an exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

FIG. 1 illustrates an exemplary embodiment of a portion of a turbomachine system 100 of the present disclosure. The turbomachine system 100 may include a turbine, such as a gas turbine, or any device that generates energy using a process fluid or a process gas, including without limitation, a turboset.

The turbomachine system 100 may include a compressor 102 having one or more inlets and one or more outlets. The compressor 102 may have one or more compression chambers. In an exemplary embodiment, the compressor 102 may be a commercially available model number, such as a Datum D10R5 compressor manufactured by Dresser-Rand Company of Olean, N.Y. However, other compressors manufactured by other manufacturers are also within the scope of the present disclosure.

The turbomachine system 100 may further include one or more mixing mechanisms, such as a first inline mixer 104 and a second inline mixer 106. Both the first inline mixer 104 and the second inline mixer 106 may be coupled to an inlet of the compressor 102. A process gas source 108 may be coupled to the first inline mixer 104. The process gas source 108 contains a process gas, such as an acid gas. The process gas may include a water condensate. Flow of a process gas from the process gas source 108 may be regulated by a valve 109.

In an exemplary embodiment, a pH modifier source 110 may be coupled to the first inline mixer 104, and the second inline mixer 106. In an exemplary embodiment, the pH modifier source 110 may include a pH modifier that includes an acid-neutralizing gas such as, but not limited to, ammonia gas that is soluble in the water condensate. In another exemplary embodiment, the pH modifier may include an ammonia compound, such as dimethyl amine. In yet another exemplary embodiment, the pH modifier source 110 may include a soluble gas that may increase the pH level of condensate in the process gas, including, for example, soluble compounds that have high vapor pressures and high pH levels at typical turbomachine system 100 operating temperatures. Flow of any pH modifier from the pH modifier source 110 may be regulated by a valve 111.

Ammonia gas or ammonia liquid is preferable over aqueous ammonia, because ammonia gas and ammonia liquid are soluble in the condensate, just like the acid gases. Because of the high solubility and strong neutralizing capabilities of ammonia gas, a small amount of ammonia in the gas phase neutralizes a relatively large amount of acid gas. In theory, the ammonia could first be dissolved in some water and that water could be injected into the compressor 102 to react with the water (condensate) coming in with the process gas. However, using aqueous ammonia is not the preferred embodiment. If aqueous ammonia were to be used, in practice, one would switch to a lower cost base, such as sodium hydroxide, or soda ash, etc. then inject that solution into the compressor. However, injecting water into the compressor 102 can create problems such as corrosion and erosion. Thus, while theoretically possible, aqueous ammonia is not preferred.

A condenser 112 may be coupled to an inlet of the second inline mixer 106. According to an exemplary embodiment, the condenser 112 may include a heat exchanger and one or more demisters. However, the condenser 112 may be any condenser configured to lower the temperature of a gas and remove condensate from the gas.

A process control mechanism 114 may be communicably coupled to the valves 109, 111. The process control mechanism 114 may include a processor (not shown) and memory (not shown), as well as other hardware and software components used to receive input and generate outputs in accordance with a control program.

Further, the process control mechanism 114 may be communicably coupled to corrosion probes 120 and 122. In an exemplary embodiment, corrosion probe 120 may be located at the outlet of the inline mixer 104, and corrosion probe 122 may be located at the outlet of inline mixer 106. In another exemplary embodiment, corrosion probe 104 may be located in piping that couples inline mixer 104 and the inlet of compressor 102, and corrosion probe 122 may be located in piping that couples inline mixer 106 to compressor 102. In yet another exemplary embodiment, the corrosion probe 120 may be placed at the inlet of compressor 102 that is coupled to the outlet of inline mixer 104, and the corrosion probe 122 may be placed at the inlet of compressor 102 that is coupled to the outlet of inline mixer 106.

Each of corrosion probes 120 and 122 may include one or more electrodes (not shown). The one or more electrodes may be made of iron. In another exemplary embodiment, the one or more electrodes may be made of any corrodible metal.

The operation of the turbomachine system 100, according to an exemplary embodiment of the present disclosure, may include providing process gas from the incoming gas source 108 to an inlet of the first inline mixer 104. The process control mechanism 114 may be configured to open and close the valve 109, thereby controlling the rate of flow of process gas from the incoming gas source 108 to the inlet of the first inline mixer 104.

The turbomachine system 100 may also a provide pH modifier from the pH modifier source 110 to an inlet of the first inline mixer 104. The process control mechanism 114 may determine the amount and rate of pH modifier provided to the first inline mixer 104. In an exemplary embodiment, the process control mechanism 114 may also be communicably coupled to the first inline mixer 104 and configured to monitor the pH of condensate detected within the first inline mixer 104. In response to the pH levels detected within the first inline mixer 104, the process control mechanism 114 may open and close valve 111, thereby controlling the provision of the pH modifier to the first inline mixer 104. In an exemplary embodiment, the process control mechanism 114 may increase the flow of the pH modifier to as the pH level of the condensate detected within the first inline mixer 104 decreases (i.e., the condensate becomes more acidic). Alternatively, the process control mechanism 114 may decrease the flow of the pH modifier as the pH level of the condensate detected within the first inline mixer 104 increases (i.e., the condensate becomes more basic).

The process control mechanism 114 may cause the valves 109, 111 to open, thereby providing an amount of pH modifier that is mixed with the process gas to cause the water condensate to have a pH level that is less acidic. For example, the pH level of condensate in the process gas prior to mixing with the pH modifier may be in the range of about 3 pH and about 3.5 pH, and the pH level of condensate in the mixture after mixing with the pH modifier may be above the range of about 3 pH and about 3.5 pH. In an exemplary embodiment, the pH level of condensate after mixture with the pH modifier may be about 5 pH. Condensate that is less acidic may be less likely to cause corrosion of the turbomachine's internal components.

Generally, raising the pH and thereby lowering the acidity of condensate in an acid gas can benefit internal metal components no matter what they are made of. However, different metals have varying corrosion tolerances with respect to acidity of condensate. For example, condensate having a pH of 4 may be more corrosive with respect to carbon steel components than stainless steel components. Further, other variables also affect how corrosive condensate in an acid gas may be with respect to internal components.

Furthermore, the relationship between pH of condensate and corrosion of internal metal components is a log relationship. For example, raising the pH of the condensate from 2.5 pH to 3 pH may be more effective at reducing the condensate's corrosive effects on internal metal components than raising the pH of the condensate from 3 pH to 4 pH.

The process control mechanism 114 may be configured to monitor the output of the first inline mixer 104 to determine whether the amount of pH modifier provided to the first inline mixer 104 should be increased. One or more sensors configured to determine the pH level of output from the first inline mixer 104 may provide input to the process control mechanism 114. The process control mechanism 114 may use the input to adjust the provision of pH modifer to the first inline mixer 104.

NACE (National Association of Corrosion Engineers) sets forth guidelines governing the use of alloys under various operating conditions. NACE also provides relationships to estimate the pH of condensate that is in equilibrium with partial pressures of $CO_2$ and $H_2S$, (e.g., NACE MR0175/ISO 15156-2:1003 Appendix D). In an exemplary embodiment, the process control mechanism 114 may use the NACE guidelines to estimate the pH level of any condensate in the process gas, and determine the amount and rate of pH modifier that should be provided to the first inline mixer 104.

NACE recognizes that certain gases may lower the pH of an acidic process gas. As the total pressure of the gas and the partial pressure of the corrosive gases increase, any condensate present in the gas may become more corrosive. More corrosion-resistant alloys may be required in portions of the compressor where the foregoing conditions may cause SSC. However, such alloys may be more expensive than less corrosion-resistant alloys.

Ammonia is an example of a pH modifier that may raise the pH of condensate present in an acidic gas. Thus, mixing ammonia gas with an acidic gas may change the pH of the condensate in a mixture. Raising the pH of condensate in an acid gas by providing ammonia may be more cost-efficient than using a more corrosion-resistant alloy to build components of a turbomachine system. For example, ammonia could be used in turbomachine systems where a compressor is only periodically exposed to elevated concentrations of acid gases.

In an exemplary embodiment, condensate present in the acid gas causes the one or more electrodes of corrosion probe 120 to corrode. The process control mechanism 114 monitors the corrosion rate of the one or more electrodes, and uses the corrosion rate to determine the amount of pH modifier that should be supplied to the first inline mixer 104.

In another exemplary embodiment, the process control mechanism 114 may provide a predetermined amount of pH modifier to the first inline mixer 104. In another exemplary embodiment, the process control mechanism 114 may use input provided by one or more mass flow meters to estimate the pH of any condensate in the process gas, and determine the amount of pH modifier that should be supplied to the first inline mixer 104. The process control mechanism 114 may also use input provided by one or more other sensors configured to collect data related to operating environment data to estimate the pH level of any condensate in the process gas.

In yet another exemplary embodiment, the process control mechanism 114 may use input provided by thermodynamic modeling software to estimate the amount of pH modifier that should be provided to the first inline mixer 104. The process control mechanism 114 may use the input described above to determine the amount of pH modifier that should be supplied to the first inline mixer 104.

The first inline mixer 104 may be configured to mix the process gas and the pH modifier to form a mixture. The mixture may flow to the compressor 102, where it is compressed and subsequently directed to the condenser 112. The condenser 112, also referred to as an "intercooler", may be configured to cool the mixture and also remove condensate from the compressed mixture. Removing condensate from the compressed mixture is beneficial for at least two reasons. One benefit of removing condensate is that it lessens the amount of moisture in the system that could cause corrosion. Further, less condensate also means that less pH modifier is necessary to raise the pH level of the remaining condensate.

The pH of the condensate is determined by the gas composition. The amount of water present in the system is infinitely small compared to the total volume of gases, and the altering of its pH by the gas components consumes a negligibly small portion of the gaseous components. When chlorides are in a system, less condensate may actually concentrate the chlorides, thereby making them more corrosive. Removing all the condensate has a dramatic effect in lowering the corrosion. However, removing only part of the condensate, at best, only reduces the area of metal being corroded, and not necessarily the corrosivity of the condensate. However, reducing the volume of water present in the system does reduce erosion caused by the water.

The cooled mixture may flow to the second inline mixer 106. The second inline mixer 106 may operate similar to first inline mixer 104. In an exemplary embodiment, the process control mechanism 114 may also control the flow of pH modifier to the second inline mixer 106 by controlling valve 111.

In an exemplary embodiment, condensate present in the acid gas causes the one or more electrodes of corrosion probe 122 to corrode. The process control mechanism 114 monitors the corrosion rate of the one or more electrodes, and uses the corrosion rate to determine a second amount of pH modifier that should be supplied to the second inline mixer 106.

In another exemplary embodiment, the process control mechanism 114 may use the NACE guidelines, as described above, to determine a second amount of pH modifier that should be provided to the second inline mixer 106 to raise the pH level to the target level. The process control mechanism 114 may also use input from one or more mass flow meters, pH sensors, and/or other operating environment data to determine the second amount of pH modifier that must be mixed with the process gas to form a mixture having condensate with a pH level that is less acidic.

In yet another exemplary embodiment, the process control mechanism 114 may also use input from thermodynamic modeling software to determine the second amount of pH modifier that should be provided to the second inline mixer 106. For example, the pH level of the condensate in the mixture prior to mixing with the second amount of pH modifier may be about 5 pH, and the pH level of the condensate in the mixture after mixing with the second amount of pH modifier may be above about 5 pH. In an exemplary embodiment, the pH level of the condensate in the mixture after mixing with the second amount of pH modifier may be about 7 pH.

The mixture produced by the second inline mixer 106 may exit the second inline mixer 106 and flow to compressor 102, where it may be compressed even further. After being compressed for a second time, the compressed mixture may be provided to another component of the turbomachine system 100.

Figure 2:
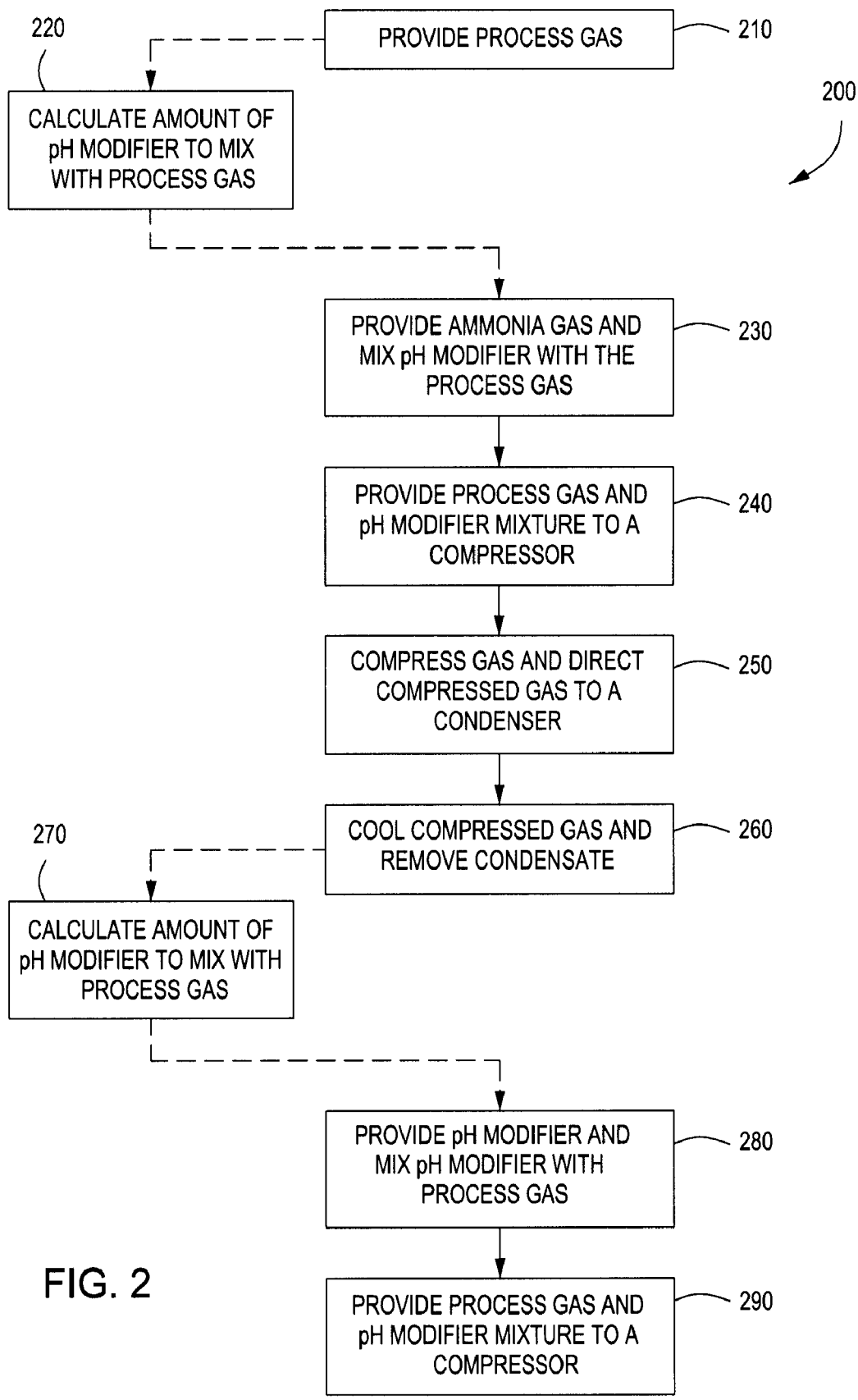
FIG. 2 illustrates a flow chart of a method for reducing corrosion in turbomachine systems according to one or more aspects of the present disclosure.

FIG. 2 illustrates an exemplary method 200 of reducing corrosion in a turbomachine system according to an exemplary embodiment of the present disclosure. The method 200 may include providing a process gas, as shown at step 210. The process gas may be an acid gas, and may include condensate with a pH level that is below the range of about 3 pH and about 3.5 pH. A process control mechanism may then determine a first amount of pH modifier that may be mixed with the process gas to form a mixture that includes a condensate having an increased pH level, as shown at step 220. As described above, in an exemplary embodiment, it may be possible to calculate this first amount using variables derived from turbomachine system operating conditions and/or NACE guidelines. According to another exemplary embodiment, the turbomachine system may use a predetermined amount of pH modifier.

The turbomachine system may provide the calculated or predetermined first amount of pH modifier to a first mixing mechanism, which upon receiving the pH modifier, may mix the pH modifier with the process gas, as shown in step 230. Mixing the pH modifier with the process gas may cause the pH level of condensate in the process gas to become less acidic. In an exemplary embodiment, the first mixing mechanism may be an inline mixer. However, other mechanisms for mixing the pH modifier and the process gas are also within the scope of the present disclosure. For example, in another exemplary embodiment, the first mixing mechanism may include customized hardware.

The turbomachine system may then provide the mixture to a compressor, as in step 240. The compressor may compress the mixture and provide the compressed mixture to a condenser, as shown in step 250. In an exemplary embodiment, the compressor system may include a process control mechanism 114 configured to calculate a second amount of pH modifier that may be mixed with the compressed gas to form a mixture that includes a condensate having a pH level that is less acidic, as shown at step 270. As described above, the calculations for determining the second amount of pH modifier may be performed by the process control mechanism 114 using turbomachine operating environment conditions and/or NACE guidelines. According to another exemplary embodiment, the compressor system may use a predetermined amount of pH modifier to raise the pH level of the remaining condensate.

The calculated or predetermined second amount of pH modifier may be provided to a second mixing mechanism configured to mix the pH modifier and the process gas, as shown at step 280. According to an exemplary embodiment, the second mixing mechanism may be an inline mixer. However, other mixing mechanisms are also within the scope of the present disclosure. For example, in another exemplary embodiment, the mixing mechanism may include customized hardware. The resulting mixture may be provided to a compressor, as shown at step 290 configured to compress the mixture.

Figure 3:
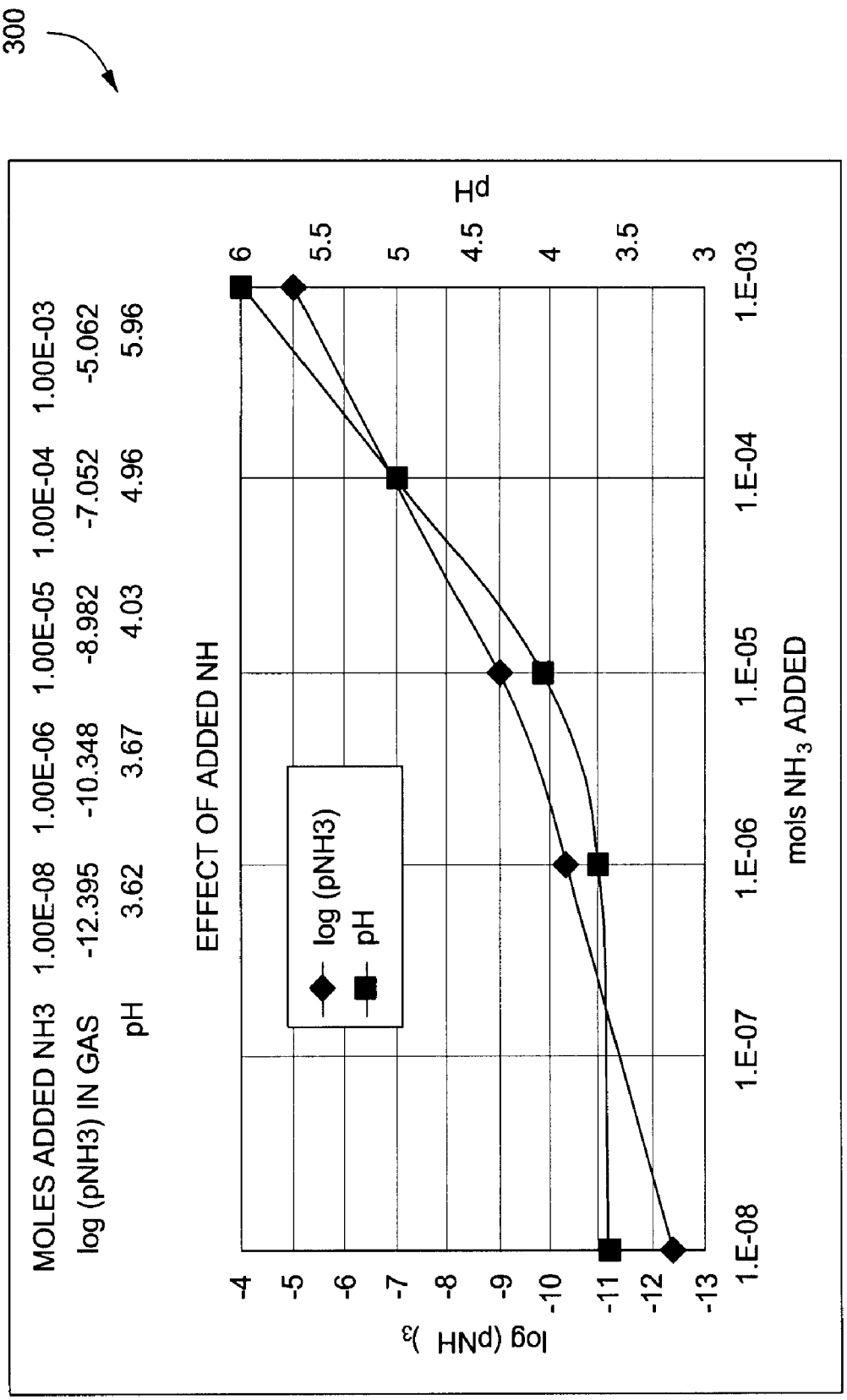
FIG. 3 illustrates a chart of thermodynamic modeling calculations according to one or more aspects of the present disclosure.

FIG. 3 is a chart 300 illustrating calculations produced by a thermodynamic model of a typical compressor environment. A person of ordinary skill in the art may use thermodynamic modeling to determine the effectiveness of a pH modifier, such as ammonia, in raising the pH level of a gas.

The thermodynamic model illustrated in FIG. 3 assumed that acid gas does not react with either itself or the pH modifier. The thermodynamic model also assumed that gas molecules only dissolve in the aqueous phase, and only form ions which are in equilibrium with each other. The results of the model, as shown in FIG. 3, indicate that $NH_3$ is a potent pH modifier.

Calculations were carried out at 50° C. and 80 atmospheres of total gas pressure. The gas phase was assumed to have the same composition before and after equilibrium with the aqueous phase, except for the small amount of gas that dissolves in the aqueous phase. The objective of the thermodynamic model results illustrated in FIG. 3 was to develop a function to describe the impact of ammonia additions on the pH of a small amount of water condensate in equilibrium with acid gases under pressure. The function was defined as follows: pH=function (T, $pH_2S$, $pCO_2$, $pNH_3$).

Several assumptions were made in determining thermodynamic model results illustrated in FIG. 3. Temperature ranges were assumed to range from 120° F. to 400° F. Further, the typical total pressure ranges were assumed to range from 1,000 to 5,000 psig. It was also assumed that the function could be developed over a limited range by carrying out thermodynamic equilibrium calculations for several carefully chosen cases, and then using regression analysis to approximate the function between the selected cases. After the function was developed, the amount of ammonia required to make adjustments in the pH of condensate could be estimated.

Thermodynamic model calculations may be executed using certain environmental constants. For example in an exemplary embodiment, the thermodynamic model calculations may be executed using 50° C. and 80 atmospheres of total gas pressure. Certain assumptions could be made regarding the calculations. For example, one assumption might be that the gas phase has the same composition before and after equilibrium with the aqueous phase, since the amount of water in the system is infinitisimally small compared to the mass of the gas phases. In an exemplary embodiment, calculations may be determined using a thermodynamic program, such as the FACTS software program, the HiSim software program, or any other conventional thermodynamics software known in the art.

The X-axis of the chart 300 represents the amount of ammonia added to 200 moles of gas. The left-hand Y-axis represents the partial pressure ammonia in the gas after it reaches aqueous equilibrium. The right-hand Y-axis represents the pH level of 1 mole of liquid in equilibrium with the gas. According to the chart 300, a small amount of ammonia may raise the pH level of an acid gas from about 3.5 to about 5, for example. This may be because the solubility of ammonia in water is higher than that of $CO_2$ or $H_2S$, and because ammonium hydroxide is a stronger base than carbonic acid is as an acid.

A thermodynamic modeling test case was performed to collect the effectiveness of using ammonia as a pH modifier. The thermodynamic modeling test case used a process gas with the following composition:

| $H_2O$ | $H_2S$ | $CO_2$ | $H_2$ | $Cl_2$ | Chlorides (ppm) | Avg. Mol. Wt. |
|---|---|---|---|---|---|---|
| 0.1524 | 8.0000 | 12.0000 | 0.0000 | 0.0003 | 99 | 21.9 |

In the thermodynamic modeling test case, the flow rates and additional information on the gas were as follows:

| Std. Vol. Flow (MMsm 3/d) | NACE? | Gas Mass Flow (kg/hr) | Initial Water (kg/hr) | ppm H$_2$S | PH$_2$S max psia |
|---|---|---|---|---|---|
| 226.0 | N | 9206473 | 11529 | 124201 | 144 |

The thermodynamic modeling test case also used the following temperature profile:

| Stages & Intercoolers | & Inlet Pressure (psia) | Outlet Pressure (psia) | Inlet Temp (Deg. F.) | Outlet Temp (Deg. F.) |
|---|---|---|---|---|
| Stage #1 | 1200 | 1400 | 123 | 142 |
| Stage #2 | 1400 | 1600 | 142 | 161 |
| Stage #3 | 1600 | 1800 | 161 | 180 |
| Stage #4 | 1800 | 2000 | 180 | 200 |

The following materials were picked for the thermodynamic modeling test case to be compatible with NACE corrosion criteria:

| Stage | YS Min req | YS Min Actual | BHN Harness Max | Alloy |
|---|---|---|---|---|
| Stage #1 | 80000 | 80000 | 352 | 718 |
| Stage #2 | 80000 | 80000 | 235 | 4330 |
| Stage #3 | 80000 | 80000 | 235 | 4330 |
| Stage #4 | 80000 | 80000 | 235 | 4330 |

The calculated partial pressures and moisture conditions and pH calculated per NACE guidelines for the thermodynamic modeling test case were as follows:

| PH$_2$O inlet (psia) | PH$_2$O sat inlet (psia) | Status In | Total H$_2$O in (kg/hr) | PH$_2$S inlet (bar) | PCO$_2$ inlet (bar) | pH inlet |
|---|---|---|---|---|---|---|
| 1.83 | 1.83 | Wet | 11529 | 6.62 | 9.93 | 3.35 |
| 2.13 | 3.02 | Dry | 11529 | 7.72 | 11.59 | 3.34 |
| 2.44 | 4.83 | Dry | 11529 | 8.83 | 13.24 | 3.35 |
| 2.74 | 7.47 | Dry | 11529 | 9.93 | 14.90 | 3.35 |

Thermodynamic modeling indicated that as little as $10^{-5}$ moles of ammonia per 100 moles of process gas, or 1.5 lbs/hr, could be added to raise the pH of the condensate to about 4.0 in Stage 1. If ammonia is mixed with a process gas in a turbomachine operating under conditions that are similar to those in the thermodynamic model test case described above, then materials such as 17-4 PH, CA6NM, or possibly 410 stainless steel could used instead of more expensive materials, such as Inconel 718, to manufacture certain turbomachine components.

Although the present disclosure has described exemplary embodiments of compressors, acid gases, and pH modifiers, it is understood that the apparatus, systems and methods described herein could applied to other turbomachine embodiments using different gases and pH modifiers. It should also be understood that the exemplary embodiments described herein could also be applied to environments where a process fluid is used instead of a process gas. In such embodiments, compounds that are similar to those used in the exemplary embodiments disclosed herein may be used.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A method for reducing corrosion in a turbomachine, comprising:
   providing a process gas to a condenser, wherein the process gas contains a condensate having a pH level that is acidic, and the condenser is configured to remove a portion of the condensate from the process gas, leaving a remaining condensate in the process gas;
   increasing the pH level of the remaining condensate to above about 4 by mixing the process gas and the remaining condensate with an amount of pH modifier to form a mixture; and
   directing the mixture to a compressor coupled to the condenser, wherein the compressor is configured to compress the mixture.

2. The method of claim 1, wherein the mixture is a first mixture, and the amount of pH modifier is a first amount of pH modifier, and further comprising mixing a second amount of pH modifier with the first mixture to form a second mixture, and thereby increasing the pH level of the remaining condensate to above about 5.

3. The method of claim 1, wherein increasing the pH level of the remaining condensate to above about 4 includes using thermodynamic modeling to determine the amount of pH modifier needed to increase the pH level of the remaining condensate to above about 4.

4. The method of claim 1, wherein increasing the pH level of the remaining condensate to above about 4 includes measuring a corrosion rate using a corrosion probe, and using the corrosion rate to determine the amount of pH modifier needed to increase the pH level of the remaining condensate to above about 4.

5. The method of claim 1, wherein the pH modifier includes ammonia.

6. The method of claim 1, wherein the pH modifier includes one of dimethyl amine, monoethanolamine, dimethylamine, or triethylamine.

7. The method of claim 1, wherein mixing the process gas with an amount of pH modifier to form a mixture includes using an inline mixer to mix the process gas with the amount of pH modifier.

8. The method of claim 1, wherein before the step of increasing the pH level of the remaining condensate to about 4, the pH level of the remaining condensate is below about 3.5.

9. The method of claim 1, wherein after the step of increasing the pH level of the remaining condensate to about 4, the pH level of the remaining condensate is above about 5.

* * * * *